Jan. 2, 1968 — R. M. VAN HOUSE — 3,361,151

BELLEVILLE SPRING CONTROLLED BYPASS VALVE

Filed June 27, 1963 — 2 Sheets-Sheet 2

INVENTOR.
Robert M. Van House
BY
D. D. McGraw
HIS ATTORNEY

United States Patent Office 3,361,151
Patented Jan. 2, 1968

3,361,151
BELLEVILLE SPRING CONTROLLED BYPASS VALVE
Robert M. Van House, Dayton, Ohio, assignor to General Motors Corporation, Detroit, Mich., a corporation of Delaware
Filed June 27, 1963, Ser. No. 291,073
5 Claims. (Cl. 137—115)

The invention relates to a fluid pressure control assembly and more particularly to one of the bypass valve type which is controlled by a spring acting in opposition to the pressure established by the valve. In many fluid pressure systems it is desirable to establish a stabilized pressure from a variable line pressure or to establish a stabilized pressure at a lower value from a higher pressure under varying operating conditions utilizing the stabilizing pressure. In accordance with the invention fluid pressure is controlled by a bypass valve arrangement wherein the valve is urged in one direction by a spring having certain desired characteristics and in the other direction by the pressure established by the bypass valve to provide a regulated or stabilized pressure. In the preferred construction disclosed in the drawings the spring is of the diskplate or Belleville type. It is also a feature of the invention to provide a pressure flow control arrangement wherein the stabilized pressure will not be lost to the system to which it is supplied should the line pressure momentarily fall below the value of the stabilized pressure.

Figure 1:
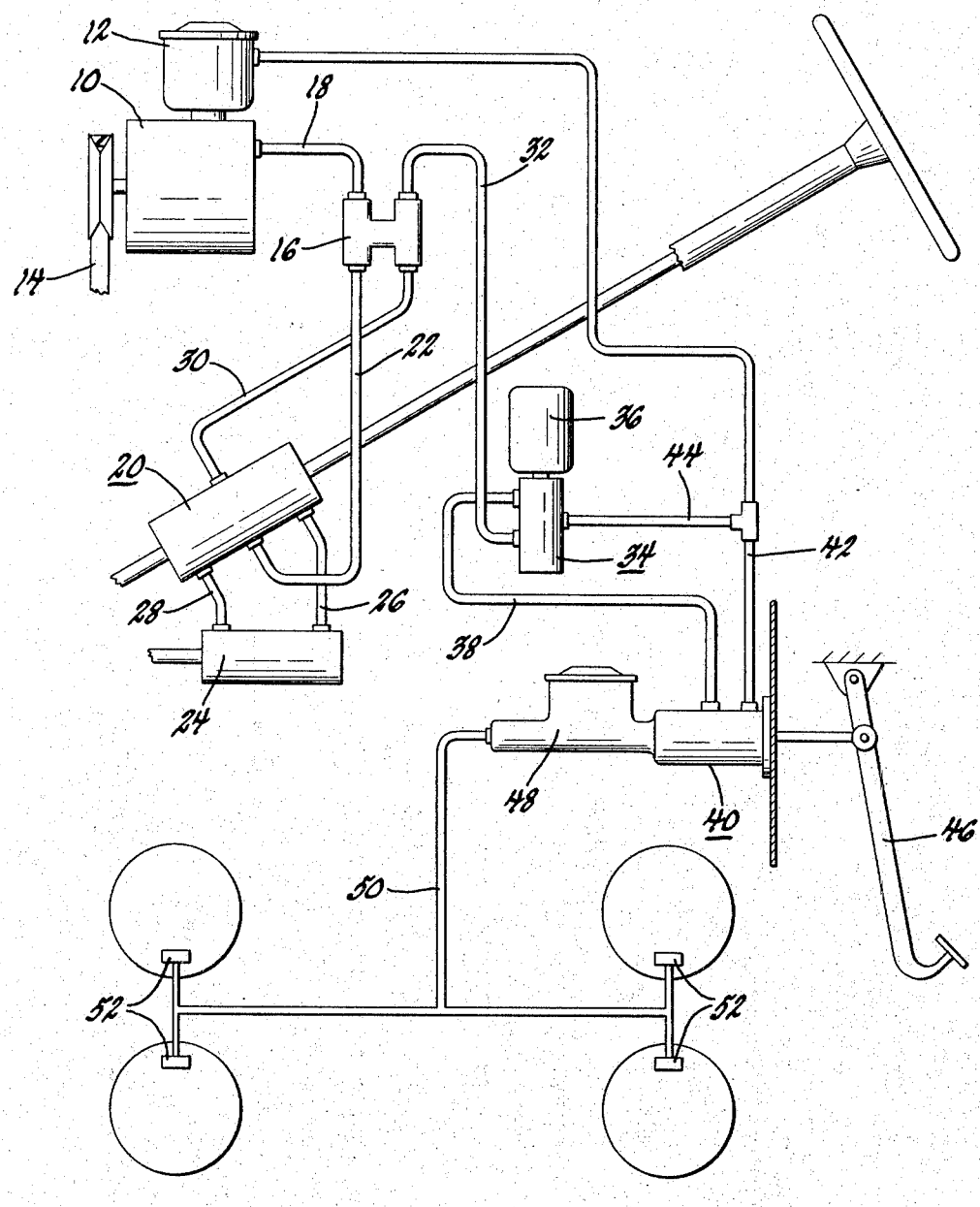
FIGURE 1 is a schematic illustration of a system utilizing a fluid pressure control assembly embodying the invention.

The fluid pressure system illustrated in FIGURE 1 utilizes a fluid pressure control assembly embodying the invention in order to provide a stabilized pressure for operation of a hydraulic power brake assembly. The system includes the fluid pressurizing pump 10 which is provided with a fluid reservoir 12. Pump 10 may be driven by any suitable means such as the belt drive 14, which may in turn be driven by the engine of a vehicle in which the system is installed. A fluid distributor 16 is connected to receive pressurized fluid through conduit 18 from pump 10 and delivers fluid to the power steering gear valve control assembly 20 through the conduit 22. Assembly 20 controls the delivery and return of pressurized fluid to and from the power steering gear booster 24 through conduits 26 and 28. Pressurized fluid leaving the assembly 20 through conduit 30 is returned to the fluid distributor 16 and then delivered through conduit 32 to the fluid pressure control assembly 34 embodying the invention. Assembly 34 has a pressure accumulator 36 connected to it in a manner to be described. Stabilized pressure is obtained from line pressure in conduit 32 by use of assembly 34 and is delivered through conduit 38 to the brake booster 40. The stabilized pressure is also utilized to charge the accumulator 36. Fluid from booster 40 is returned to reservoir 12 through conduit 42. Conduit 44 also conducts the excess fluid from assembly 34 to the reservoir 12 by connecting with conduit 42.

Brake booster 40 is controlled by the vehicle operator through the brake pedal 46 and pressurized fluid generated in the master cylinder 48 under action of booster 40 is delivered through conduit system 50 to the front and rear brake wheel cylinders 52 to actuate the vehicle brakes. This system is of the same type as that disclosed and claimed in patent application Ser. No. 291,119, filed on June 27, 1963, now Patent Number 3,170,536, in the names of Robert M. Van House, Charles R. Kenrick and George E. Kellogg, and entitled "Hydraulic Power Brake and Power Steering System." The fluid distributor 16 is the subject of patent application Ser. No. 291,156, filed on June 27, 1963 in the names of Robert L. Gephart and Robert M. Van House, and entitled "Valving for Hydraulic Power Brake System." These applications are therefore incorporated by reference as if fully reproduced herein and reference is made to them for a more detailed explanation of the functioning of the various components of the system as disclosed in FIGURE 1.

Figure 2:
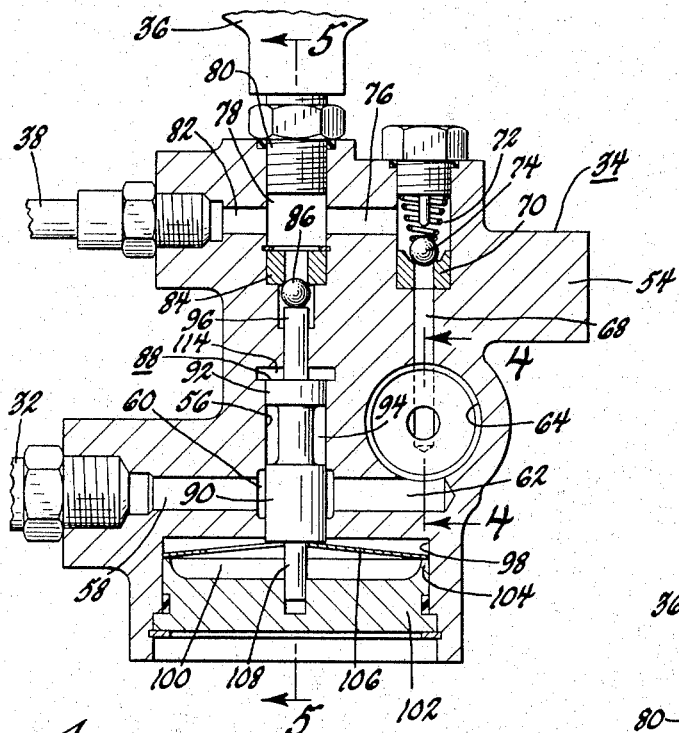
FIGURE 2 is a cross section view with parts broken away illustrating in detail a fluid pressure control assembly embodying the invention.
Figure 4:
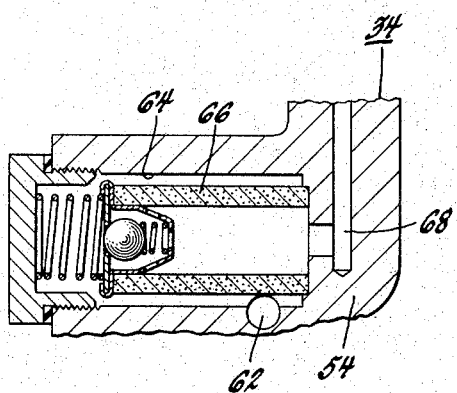
FIGURE 4 is a cross section view of a portion of the assembly of FIGURE 2 taken in the direction of arrows 4—4 of that figure.

FIGURE 2 shows the fluid pressure control assembly 34 in detail. The assembly includes a housing 54 in which is provided a valve bore 56. In different portions of bore 56 chambers formed thereby are of different diameters for reasons brought out below. An inlet passage 58 formed in housing 54 has the line pressure conduit 32 connected to it. An annular chamber 60 formed as an enlarged portion of bore 56 is connected with passage 58 and a second passage 62 extends beyond chamber 60 as a continuation of passage 58. A filter chamber 64 is provided in housing 54 and receives the filter 66. This filter may be of the type providing for bypassing the filter element should that element become sufficiently impervious to pass the desired quantities of fluid. Passage 62 is connected with the chamber 64 on one side of the filter 66 and another passage 68 is connected with chamber 64 on the other side of filter 66. Passage 68 terminates in a check valve seat 70 positioned in a valve chamber 72. A check valve 74 engageable with seat 70 acts to permit fluid flow from passage 68 into chamber 72 but prevents reverse fluid flow. Another passage 76 connects chamber 72 with the chamber 78 formed by another part of bore 56. An accumulator pressure outlet 80 connects chamber 78 to the accumulator 36 so that the accumulator can receive and discharge pressure to and from chamber 78. An outlet passage 82 connects chamber 78 with the stabilized pressure conduit 38 which delivers stabilized fluid pressure to the booster 40.

Chamber 78 has a valve seat 84 in the end thereof opposite the accumulator outlet 80 and a valve 86 is arranged to seat on seat 84 on the side thereof opposite chamber 78 so that pressure in chamber 78 tends to open valve 86. A bypass valve 88 is received in bore 56 so that one land 90 extends through annular chamber 60. The valve is grooved to provide another spaced land 92 in bore 56 so that an exhaust pressure chamber 94 is formed by bore 56 and lands 90 and 92. Valve 88 has an extension 96 passing through a reduced section of bore 56 and engaging the valve 86 so that movement of the valve under force exerted thereon by pressure in chamber 78 is transmitted to the valve 88. Bore 56 is also provided with an enlarged section 98 adjacent chamber 60 and opposite exhaust chamber 94. Bore section 98 provides a spring chamber 100 which is closed by the plug 102. The inner end of plug 102 terminates in an annular spring-engaging shoulder 104 against which the outer annulus of the Belleville spring 106 rests. The inner annulus of spring 106 is received about another extension 108 of valve 88 which is on the opposite end of the valve from extension 96. As is better shown in FIGURE 5, exhaust chamber 94 is connected through a passage 110 to the exhaust conduit 44. Restrictive flow passage 112 connects spring chamber 100 with passage 110 and also connects an exhaust pressure chamber 114 with passage 110. Chamber 114 is provided as a part of bore 56 and one wall thereof is provided by the adjacent side of valve land 92.

Figure 3:
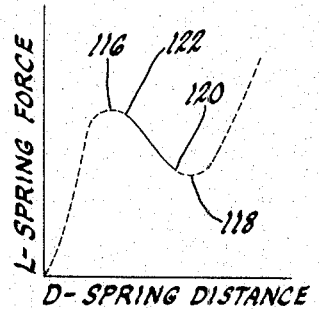
FIGURE 3 is a spring characteristic curve for the spring utilized in the assembly of FIGURE 2 and showing in a solid line the portion of the curve in which the spring preferably operates.
Figure 5:
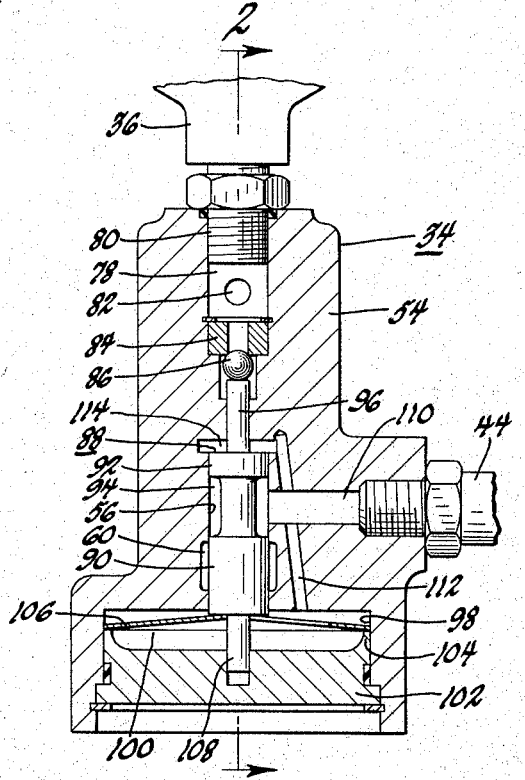
FIGURE 5 is a cross section view of a portion of the assembly of FIGURE 2 taken in the direction of arrows 5—5 of that figure.

FIGURE 3 shows the spring characteristic curve of spring 106 with the portion of the curve in which the spring operates in assembly 34 being shown by a solid line and other portions of the curve being shown by a dashed line. The curve is a typical L/D curve plotting spring force against spring distance. It is noted that the operative portion of the curve is intermediate the over-center point 116 and the point 118 representing free extension of the spring in one direction. Referring to the spring characteristic curve in geometric terms, the operative portion of the curve has a negative slope at all points. This characteristic is obtained by limiting the distance through which the spring may pass during valve operation so that the spring is always exerting an upward force on valve 88. When the valve is in its upward position so that valve 86 is held closed, as shown in FIGURES 2 and 5, the spring 106 is at point 120 on the spring characteristic curve. When valve 88 is in its maximum down position the spring is at point 122 on the curve.

Line pressure in conduit 32 enters passage 58 and is conducted to annular chamber 60, passage 62, through filter 66 and into passage 68 to open check valve 74, and then through chamber 72 and passage 76 into chamber 78. As the pressure initially builds up, it exerts a force on valve 86 tending to move valve 88 downwardly against the force of spring 106. The upper edge of land 90 moves upon slight downward movement of valve 88 to crack open annular chamber 60 to exhaust chamber 94, thus bypassing fluid and establishing a stabilized pressure in and beyond passage 62. The stabilized pressure acts on valve 86 so as to maintain the pressure substantially constant. If at any time the stabilized pressure decreases due to operation of brake booster 40, the force on valve 86 decreases and is overcome by the force exerted by spring 106 to move land 90 toward the closed position until the stabilized pressure is again reached, at which time land 90 is so positioned as to maintain the stabilized pressure. Should the line pressure in conduit 32 drop for any reason, such as insufficient fluid in reservoir 12, check valve 74 will close and the stabilized pressure will be maintained in chamber 78 and portions of the system connected therewith. Since the accumulator 36 is charged with stabilized pressure, brake booster 40 may be actuated even though there is a failure of line pressure.

In order to prevent pressure shocks from being exerted through the system, valve 88 is provided with a damping system. One part of the damping system includes the restrictive flow passage 112 and spring chamber 100. Should sudden changes occur in the system connected to the stabilized pressure chamber 78, valve 88 will tend to move suddenly under influence of spring 106. This movement is damped, however, since spring 106 tends to displace fluid from one part of chamber 100 to another part thereof by movement of the spring. Furthermore, as the spring is moving the valve upwardly, it tends to displace fluid through restrictive flow passage 112. Thus a dash pot action is obtained. In addition, chamber 114, which is also filled with fluid under exhaust pressure, acts as a dashpot. Thus the movements of bypass valve 88 are more deliberate than they would be otherwise and pressure shock waves caused by sudden opening or closing of land 90 are prevented.

In the claims:

1. A fluid pressure control assembly comprising in combination, a housing having a valve bore formed therein and a fluid line pressure inlet and a fluid exhaust pressure outlet and a fluid stabilized pressure outlet and a fluid stabilized pressure accumulator outlet connected to said bore, a bypass valve reciprocably received in said bore and having means controlling fluid pressure bypassing action between said line pressure inlet and said exhaust pressure outlet to establish a stabilized pressure, passage means formed in said housing connecting said bore at the connection with said line pressure inlet with the bore connection with said accumulator and stabilized pressure outlets and having a check valve therein permitting fluid flow only from said fluid bypassing control means to said accumulator and stabilized pressure outlets, said bypass valve having all areas in said bore pressure balanced except for a differential area in said bore exposed only to said stabilized pressure whereby the only unbalanced pressure generated force on said valve is exerted thereon by said stabilized pressure, and spring means opposing the force exerted thereon by said stabilized pressure to control the bypassing valve action.

2. The combination of claim 1, said spring means comprising a Belleville spring operating on the spring characteristic curve only in an area having a slope of one sign.

3. The combination of claim 2, said Belleville spring operating on only a continuous spring characteristic curve portion having a negative sign.

4. A bypass valve assembly for establishing a stabilized pressure at a lesser value than line pressure supplied thereto and comprising in combination, a pressure bypass valve for controlling the bleeding of line pressure to exhaust to establish said stabilized pressure, means moving and positioning said valve having all valve areas pressure balanced except for a valve area subject only to said stabilized pressure for generating a first force tending to reduce said stabilized pressure, a Belleville spring operative only on one side of the center thereof to exert an opposing second force tending to increase said stabilized pressure, said forces being in equal and opposite relation at said stabilized pressure, and a fluid tight spring chamber connected to receive exhaust fluid through a restrictive flow orifice and having said Belleville spring therein whereby exhaust pressure fluid in said chamber provides a damping action on said spring to prevent sudden movement thereof in response to sudden changes in said first force to reduce pressure shocks in said stabilized pressure.

5. A bypass valve assembly for establishing a stabilized pressure at a lesser value than line pressure supplied thereto and comprising in combination, a pressure bypass valve for controlling the bleeding of line pressure to exhaust to establish said stabilized pressure, means moving and positioning said valve having all valve areas pressure balanced except for a valve area subject only to said stabilized pressure for generating a first force tending to reduce said stabilized pressure, a Belleville spring operative only on one side of the center thereof to exert an opposing second force tending to increase said stabilized pressure, said forces being in equal and opposite relation at said stabilized pressure, and a chamber formed by said bore and a surface of said valve and having restrictive flow connection with exhaust fluid to receive exhaust fluid therein for a dashpot action to prevent suddent movement of said valve in response to a sudden decrease in stabilized pressure.

References Cited

UNITED STATES PATENTS

| | | | |
|---|---|---|---|
| 2,174,797 | 10/1939 | Magnuson | 137—115 X |
| 2,188,463 | 1/1940 | Mercier | 137—116 |
| 2,325,193 | 7/1943 | Nutt | 267—1 |
| 2,622,611 | 12/1952 | Stark | 137—116 |

FOREIGN PATENTS 682,535  11/1952  Great Britain.

WILLIAM F. O'DEA, *Primary Examiner.*

D. H. LAMBERT, *Assistant Examiner.*